(12) United States Patent
Ko et al.

(10) Patent No.: US 11,830,272 B2
(45) Date of Patent: Nov. 28, 2023

(54) METHOD AND APPARATUS FOR IDENTIFYING ANIMAL SPECIES

(71) Applicant: Korea University Research and Business Foundation, Seoul (KR)

(72) Inventors: Hanseok Ko, Seoul (KR); Sangwook Park, Jeju-si (KR); Kyung-Deuk Ko, Hanam-si (KR); Donghyeon Kim, Gyeongsan-si (KR)

(73) Assignee: Korea University Research and Business Foundation, Seoul (KR)

( * ) Notice: Subject to any disclaimer, the term of this patent is extended or adjusted under 35 U.S.C. 154(b) by 365 days.

(21) Appl. No.: 17/279,661

(22) PCT Filed: Apr. 18, 2019

(86) PCT No.: PCT/KR2019/004677
§ 371 (c)(1),
(2) Date: Mar. 25, 2021

(87) PCT Pub. No.: WO2020/080626
PCT Pub. Date: Apr. 23, 2020

(65) Prior Publication Data
US 2022/0036053 A1   Feb. 3, 2022

(30) Foreign Application Priority Data

Oct. 16, 2018  (KR) .......................... 10-2018-0122900

(51) Int. Cl.
*G06V 40/10* (2022.01)
*G06N 3/02* (2006.01)
(Continued)

(52) U.S. Cl.
CPC ............ *G06V 40/10* (2022.01); *G06F 18/217* (2023.01); *G06F 18/254* (2023.01); *G06N 3/02* (2013.01); *G10L 17/26* (2013.01)

(58) Field of Classification Search
CPC .... G06V 40/10; G06V 10/811; G06V 10/993; G06F 18/217; G06F 18/254;
(Continued)

(56) References Cited

U.S. PATENT DOCUMENTS

| 2013/0132311 A1* | 5/2013 | Liu ....................... G06V 10/774 706/12 |
| 2018/0046872 A1* | 2/2018 | Diamond ............... G16H 30/40 |
| 2019/0012581 A1* | 1/2019 | Honkala .............. G06V 10/758 |

FOREIGN PATENT DOCUMENTS

| JP | 2016-212653 A | 12/2016 |
| KR | 10-2016-0098581 A | 8/2016 |

(Continued)

OTHER PUBLICATIONS

Arthropod, Wikipedia (Year: 2023).*
(Continued)

*Primary Examiner* — Jianxun Yang
(74) *Attorney, Agent, or Firm* — NSIP Law

(57) ABSTRACT

Disclosed are a method and an apparatus for identifying animal species by using audiovisual information. A method for identifying animal species, according to one embodiment of the present invention, may include: a step of receiving an input signal for an object to be identified; a step of processing image information and acoustic information based on the input signal, wherein a processing result of the image information and a processing result of the acoustic information are represented by class-specific scores; a step of determining whether the image information processing result and the acoustic information processing result corresponding to the input signal exist; and a final result derivation step of fusing the image information processing result and the acoustic information processing result according to the determination result and classifying the object to be
(Continued)

identified as a certain animal species by using the fused processing result.

4 Claims, 7 Drawing Sheets

(51) Int. Cl.
 *G10L 17/26* (2013.01)
 *G06F 18/21* (2023.01)
 *G06F 18/25* (2023.01)

(58) Field of Classification Search
 CPC ...... G06F 18/2413; G06N 3/02; G06N 3/045; G06N 3/08; G10L 17/26; G10L 17/10
 See application file for complete search history.

(56) References Cited

FOREIGN PATENT DOCUMENTS

| | | |
|---|---|---|
| KR | 10-2017-0096298 A | 8/2017 |
| KR | 10-2018-0060257 A | 6/2018 |
| KR | 10-1891631 B1 | 8/2018 |

OTHER PUBLICATIONS

International Search Report dated Jul. 17, 2019 in counterpart International Patent Application No. PCT/KR2019/004677 (2 pages in English and 2 pages in Korean).

* cited by examiner

[FIG. 1]
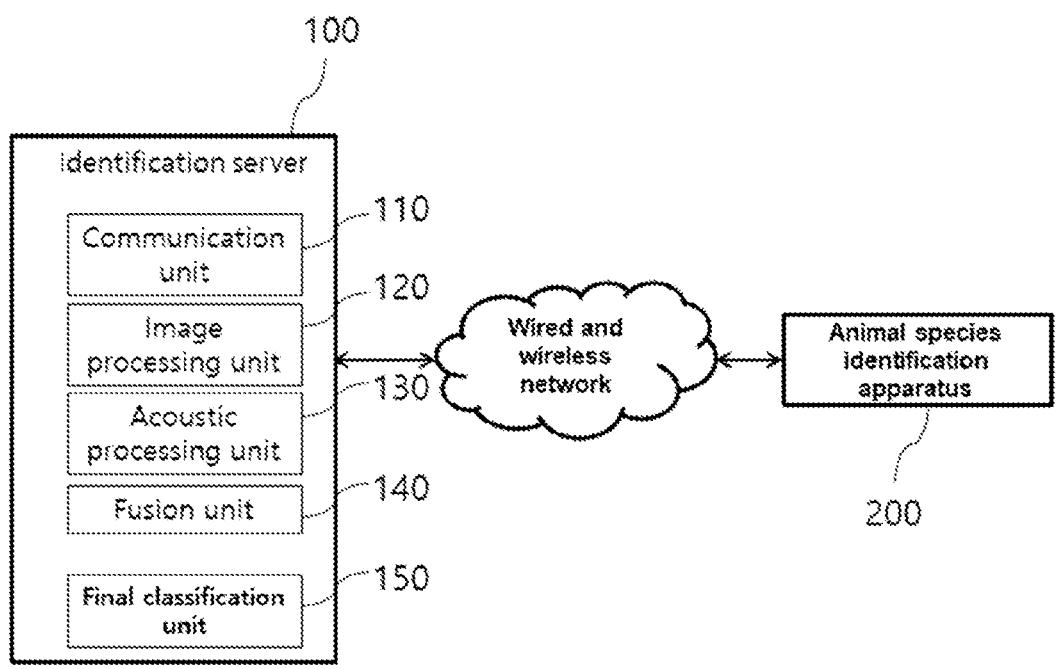

[FIG. 2]
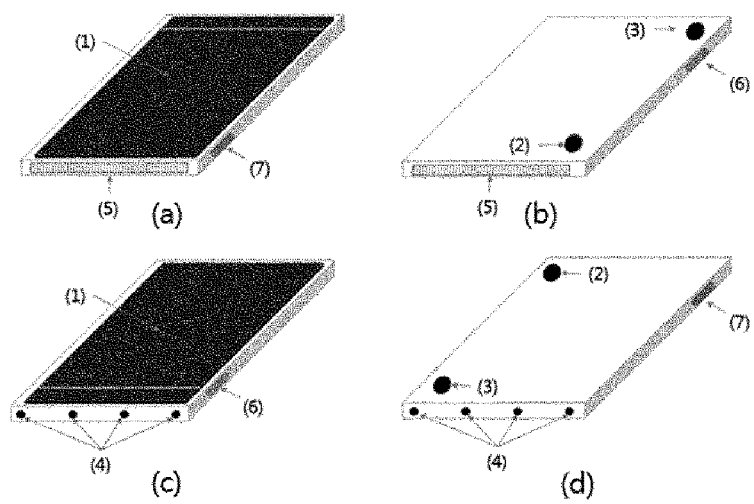

[FIG. 3]
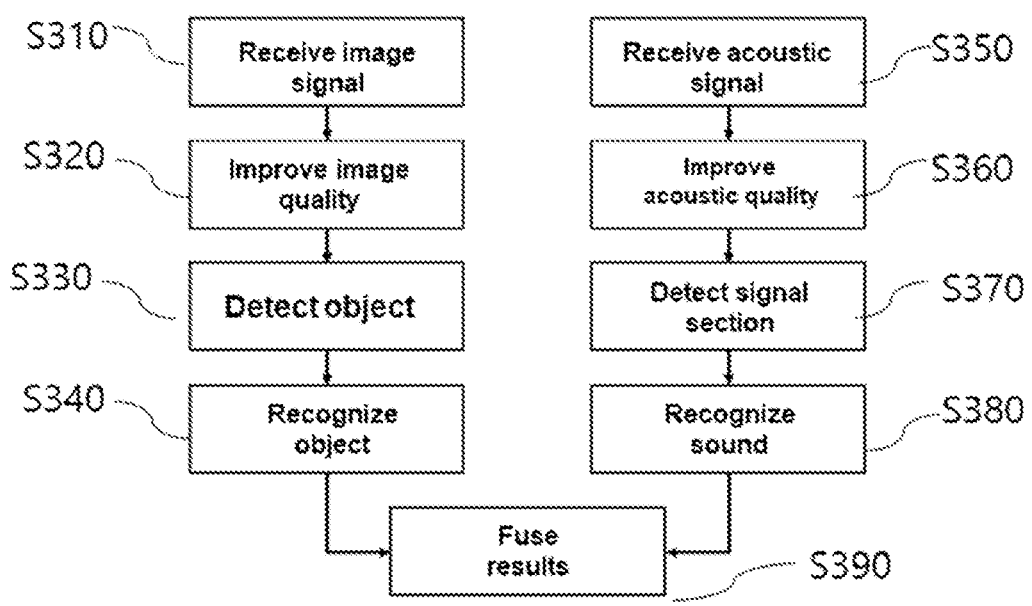

[FIG. 4]
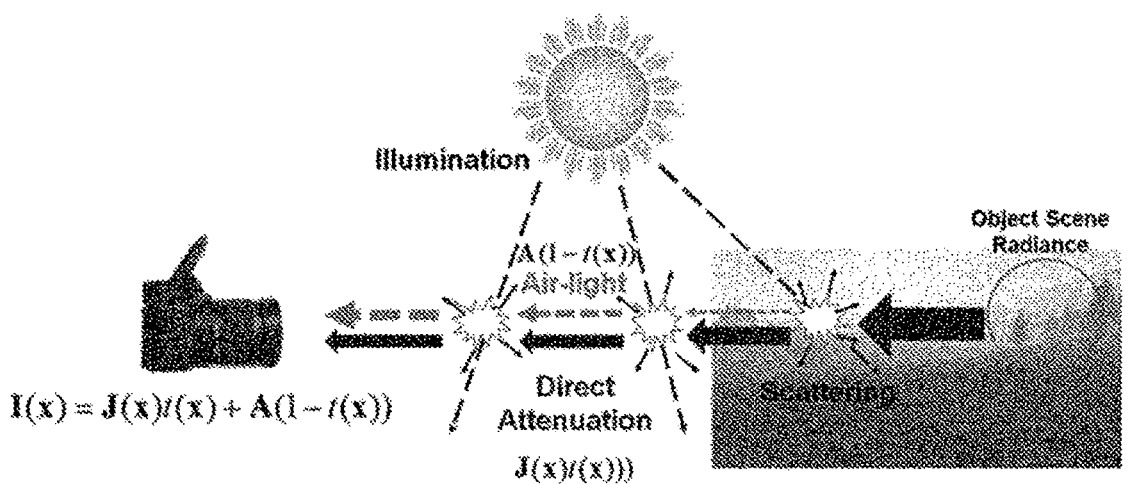

[FIG. 5]
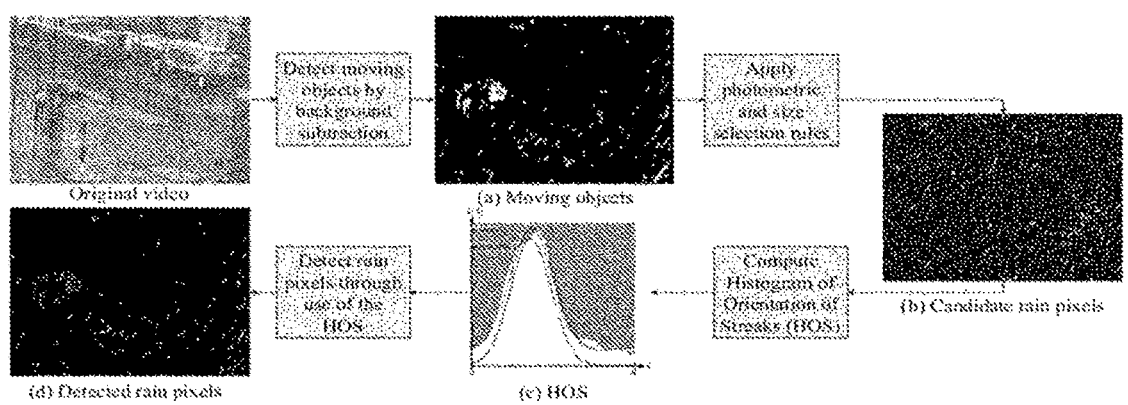

[FIG. 6]
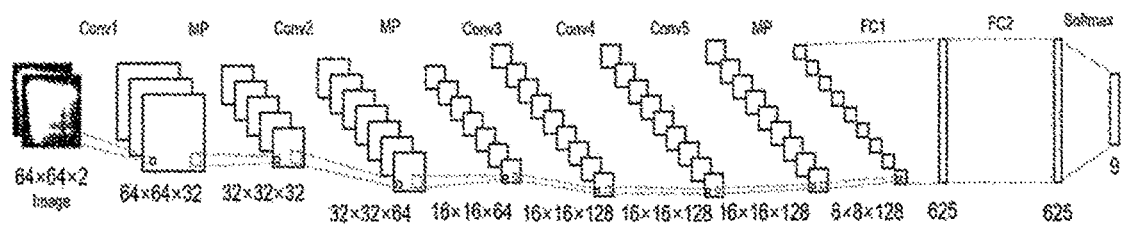

[FIG. 7]
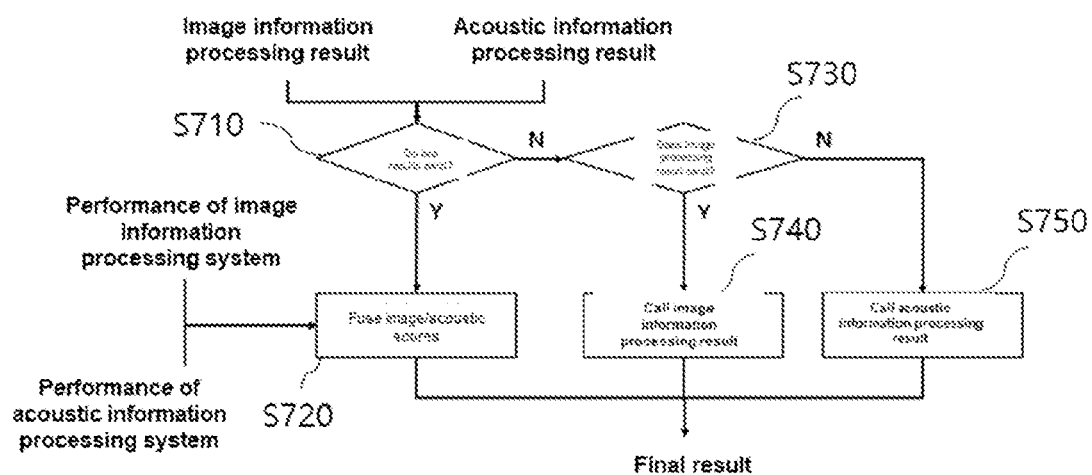

METHOD AND APPARATUS FOR IDENTIFYING ANIMAL SPECIES

CROSS-REFERENCE TO RELATED APPLICATION

This application is a National Phase Application of PCT International Application No. PCT/KR2019/004677, which was filed on Apr. 18, 2019, and which claims priority from Korean Patent Application No. 10-2018-0122900 filed on Oct. 16, 2018. The disclosures of the above patent applications are incorporated herein by reference in their entirety.

BACKGROUND

(a) Technical Field

The present invention relates to a method and an apparatus for identifying animal species, and more particularly, to a method and an apparatus for identifying animal species by using audiovisual information.

(b) Background Art

In order to control all risks that may arise in a process of producing, distributing, and moving animals not only domestically, but also internationally, each country including the UN has made an effort to operate an effective and highly reliable animal tracking and identification system, and recently, has conducted various attempts and researches to construct a better system through advanced information technology in addition to traditional methods. As a related prior art, there is Korean Patent Publication No. 10-2014-0138103.

In addition, as the related art, there is a method of detecting animals based on image recognition. This method is a technology capable of detecting whether there are animals in a predetermined monitoring area using a plurality of sensors. That is, when animals enter the monitoring area, the animals are detected and a warning device such as a housing may be operated.

However, the technology may detect the animals entering the monitoring area. However, it is possible to determine whether the corresponding animal is an animal or not, but it is impossible to distinguish which species it is.

Therefore, it is necessary to study a technology that can more accurately and conveniently distinguish various animal species.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

An object of the present invention is to provide a method for identifying animal species capable of identifying animal species in an artificial intelligence method using audiovisual information on an object to be identified.

In order to achieve the object, according to one embodiment of the present invention, there is disclosed a method for identifying animal species including: a step of receiving an input signal for an object to be identified; a step of processing image information and acoustic information based on the input signal, wherein a processing result of the image information and a processing result of the acoustic information are represented by class-specific scores; a step of determining whether the image information processing result and the acoustic information processing result corresponding to the input signal exist; and a final result derivation step of fusing the image information processing result and the acoustic information processing result according to the determination result and classifying the object to be identified as a certain animal species by using the fused processing result.

According to the method for identifying animal species according to an embodiment of the present invention, it is possible to more conveniently identify the animal species by using the audiovisual information of the object to be identified.

According to an embodiment of the present invention, it is possible to build an infrastructure for investigating native animals and supplement the manpower of insufficient experts by identifying animal species in an artificial intelligence method.

The effects of the present invention are not limited to the aforementioned effect, and other effects not mentioned above will be clearly understood to those skilled in the art from the description of the appended claims.

BRIEF DESCRIPTION OF THE DRAWINGS

FIG. 1 is a block diagram for describing a method for identifying animal species according to an embodiment of the present invention.

FIG. 2 is a diagram illustrating an apparatus for identifying animal species according to an embodiment of the present invention.

FIG. 3 is a flowchart illustrating a method for identifying animal species according to an embodiment of the present invention.

FIG. 4 is a diagram for describing an atmospheric optical model structure according to an embodiment of the present invention.

FIG. 5 is a diagram for describing a method for removing rain and snow from an image according to an embodiment of the present invention.

FIG. 6 is a CNN structure diagram for recognizing an acoustic signal according to an embodiment of the present invention.

FIG. 7 is a flowchart illustrating a method for fusing image information and acoustic information in the method for identifying animal species according to an embodiment of the present invention.

DETAILED DESCRIPTION

Hereinafter, a method and an apparatus for identifying animal species according to an embodiment of the present invention will be described with reference to the accompanying drawings.

A singular form used in the present specification may include a plural form if there is no clearly opposite meaning in the context. In the present application, the term such as "comprising" or "including" should not be interpreted as necessarily including all various components or various steps disclosed in the specification, and it should be interpreted that some component or some steps among them may not be included or additional components or steps may be further included.

FIG. 1 is a block diagram for describing a method for identifying animal species according to an embodiment of the present invention.

As illustrated in FIG. 1, an identification server 100 and an animal species identification apparatus 200 may be connected to each other via a network. The network refers to a network that performs communication via a medium, and may include at least one of a wired communication network, a computer network, and a wireless communication network.

The identification server 100 may receive image information obtained by capturing a motion and the like for a specific animal from the animal species identification apparatus 200 and acoustic information obtained by recording a crying sound and the like of the specific animal. Based on the received information, the identification server 100 may identify the specific animal as a certain animal species, and transmit the result to the animal species identification apparatus 200.

The identification server 100 may include a communication unit 110, an image processing unit 120, an acoustic processing unit 130, a fusion unit 140, and a final classification unit 150.

The communication unit 110 may receive an image signal and an acoustic signal for the specific animal input to the animal species identification apparatus 200, and transmit an identification result for the specific animal finally classified based on the received input signal to the animal species identification apparatus 200.

The image processing unit 120 may recognize an object based on the received image signal for the specific animal.

The acoustic processing unit 130 may recognize a sound of the specific animal based on the received acoustic signal for the specific animal.

The fusion unit 140 may fuse a processing result of the image information processed by the image processing unit 120 and a processing result of the acoustic information processed by the acoustic processing unit 130.

The final classification unit 150 may finally classify the specific animal as a certain animal species based on the result fused by the fusion unit 140.

FIG. 2 is a diagram illustrating an apparatus for identifying animal species according to an embodiment of the present invention. Hereinafter, the apparatus for identifying animal species described in the embodiment represents a mobile apparatus, but may be implemented as a fixed apparatus.

FIG. 2A is a perspective view of the animal species identification apparatus 200 viewed from one direction, FIG. 2B is a perspective view of the animal species identification apparatus 200 of FIG. 2A in a state where the upper and lower surfaces are turned upside down, FIG. 2C is a perspective view of the animal species identification apparatus 200 of FIG. 2A in a state where the front and rear sides are changed in position, and FIG. 2D is a perspective view of the animal species identification apparatus 200 of FIG. 2B in a state where the front and rear sides are changed in position.

The animal species identification apparatus 200 includes a touch screen 1, a first camera 2, a second camera 3, a microphone 4, a heat dissipation hole 5, a power switch 6, and a data terminal 7.

The touch screen 1 may output an analysis result and related information of the artificial intelligence identification method received from the identification server 100 while receiving a user's command.

The first camera 2 and the second camera 3 may capture an image signal to be analyzed by the artificial intelligence identification method. The first camera 2 and the second camera 3 may be the same type of camera or different types of cameras. For example, one of the first camera 2 and the second camera 3 may be a CCD camera, and the other thereof may be an infrared camera.

The microphone 4 may receive an acoustic signal to be analyzed by the artificial intelligence identification method. In the microphone 4, a plurality of microphones may be arranged at predetermined intervals. For example, as illustrated in FIG. 1, four microphones are configured, and the microphones may be arranged at intervals of 2.5 cm, respectively.

The heat dissipation hole 5 may emit heat generated when the animal species identification apparatus 200 is driven.

The power switch 6 may turn on or off the power of the animal species identification apparatus 200.

The data terminal 7 is a terminal capable of accessing a storage memory built into the device, and may upload/download the data.

The animal species identification apparatus 200 may receive the image signal of the object to be identified (or an animal to be identified) from the first camera 2 or the second camera 3, and receive the acoustic signal of the object to be identified (or an animal to be identified) from the microphone 4. The received image signal and acoustic signal may be transmitted to the identification server 100. The identification server 100 may process the received image signal and acoustic signal, respectively, and fuse the processed results thereof to finally classify the object to be identified as a certain animal species.

FIG. 3 is a flowchart illustrating a method for identifying animal species according to an embodiment of the present invention.

The communication unit 110 of the identification server 100 may receive the image signal input to the animal species identification apparatus 200 (S310).

The image processing unit 120 may process the received image signal to derive an image information processing result.

First, the image processing unit 120 may perform image quality improvement (S320). A method of removing fog/smoke from the received image signal may be used to improve the image quality.

FIG. 4 is a diagram for describing an atmospheric optical model structure according to an embodiment of the present invention.

In FIG. 4, I means observation data, x means a pixel coordinate within the image, J means an image from which fog is removed, t means a transmission amount, and A means whole atmospheric scattered light. The method for removing the fog/smoke based on this atmospheric optical model consists of a local atmospheric scattered light estimating step, a local transmission amount estimating step, an atmospheric scattered light and transmission amount refining step.

In the local atmospheric scattered light estimating step, an input image is converted into a gray image and divided into M×M blocks, and then a minimum value is found as shown in Equation 1.

$$T_k^{block} = \min_{y \in L_k^{block}} L(y) \qquad \text{[Equation 1]}$$

In this case, L means a divided individual block, and y means a pixel coordinate within the block.

A lower threshold value (Alow_threshold) of scattered light is estimated to minimize a value of ∥(rx, gx, bx)−(1, 1, 1)∥ through quad-tree subdivision. Finally, local scattering light is estimated through Equation 2 through the values of the lower threshold value of scattered light.

$$A(x) = \begin{cases} A_{local}(x), & \|1 - A_{local}(x)\| \le \rho \cdot \|1 - A_{low\_threshold}\| \\ A_{low\_threshold}, & \text{otherwise} \end{cases} \quad \text{[Equation 2]}$$

In the transmission amount estimating step, the transmission amount is estimated as a value that maximizes an objective function consisting of functions of image entropy, information fidelity, and dynamic range, Equation 3 below.

$$f_{objective}(t) = f_{entropy}(t) \cdot f_{fidelity}(t) \cdot f_{range}(t), \quad \text{[Equation 3]}$$

$$f_{entropy}(t) = -\sum_{i=0}^{255} \frac{h_i(t)}{N} \log \frac{h_i(t)}{N},$$

$$f_{fidelity}(t) = \min_{c \in \{r,g,b\}} s^c(t),$$

$$s^c(x) = \frac{1}{N}\sum_{x=1}^{N} \delta(x), \delta(x) = \begin{cases} 1, & 0 \le J^c(x) \le 255 \\ 0, & \text{otherwise} \end{cases}$$

$$f_{range}(t) = \max(J^{gray}(t)) - \min(J^{gray}(t))$$

Here, N represents the number of all pixels, and hi represents the number of i-pixel values (intensity).

In the case of fog and smoke, since the concentration thereof varies depending on a distance, the objective function (Equation 3) is maximized for each block to estimate the transmission amount, and finally, the estimated transmission amount of a k-th block is as shown in Equation 4 below.

$$t_k^{block} = \arg\max_{t \in \{0.01 \le t \le 1\}} f_{objective}(t) \quad \text{[Equation 4]}$$

As a method of refining the scattered light and the transmission amount estimated in a local block unit, in the present invention, block artifacts occurring in a boundary region are refined through a weighted least squares (WLS) optimization method. The WLS-based refining method obtains a solution that minimizes an objective function (Equation 5 below).

$$\sum_x \left( (t_x - \tilde{t}_x)^2 + \lambda \left( w_{a,x}(h)\left(\frac{\partial t}{\partial a}\right)_x^2 + w_{b,x}(h)\left(\frac{\partial t}{\partial b}\right)_x^2 \right) \right), \quad \text{[Equation 5]}$$

$$w_{a,x}(h) = \left( \left|\frac{\partial h}{\partial a}\right|_x^\alpha + \varepsilon \right)^{-1}, w_{b,x}(h) = \left( \left|\frac{\partial h}{\partial b}\right|_x^\alpha + \varepsilon \right)^{-1}$$

In this case, $\tilde{t}$ represents a result estimated through Equation 4, and t represents a result image to be refined. h represents a morphologically processed image through a fog image converted to gray, and λ represents a smoothing control variable. a and b represent horizontal and vertical directions of each image, and a represents a weight adjustment variable. ε represents a fine constant value to prevent a denominator from being divided by 0. The solution obtained through the differentiation of Equation 5 is shown in Equation 6 below.

$$t = (I + \lambda(D_a^T A_a D_a + D_b^T A_b D_b))^{-1}\tilde{t} \quad \text{[Equation 6]}$$

In Equation 6, A represents a matrix in which a weight value of Equation 11 is included in a diagonal component for each of horizontal and vertical directions, and D represents a first-order differential matrix operator.

The image from which the fog is removed through the finally estimated local scattered light and transmission amount is restored through Equation 7 below.

$$J(x) = \frac{I(x) - A(x)}{t(x)} + A(x) \quad \text{[Equation 7]}$$

In addition, the method of removing fog/smoke from the received image signal may be used to improve the image quality.

FIG. 5 is a diagram for describing a method for removing rain and snow from an image according to an embodiment of the present invention.

In image data continuously observed through the first camera 2 or the second camera 3, a moving object is detected based on the mobility of the object and a background without motion is removed. An object for snow/rain is selected based on the size of the detected area. For the selected candidate group, the snow/rain object is determined based on the Histogram of Orientation (HOG). The finally detected object is determined as the object for snow/rain and removed from the observation data.

Through the restored image as described above, the image processing unit 120 may detect an object and recognize the detected object (S330 and S340).

The object detection is a step of recognizing positions and regions of objects in an image with improved image quality, and the object recognition is a step of recognizing what the detected object is. For these two steps, a region convolutional neural network (RCNN) based on a convolutional neural network (CNN) is applied. The RCNN recognizes the position of the object and what the object is based on a convolutional operation result of the image by using a filter of a fixed size like the CNN. In a final output layer, a class-specific score for the image signal is calculated.

On the other hand, the CNN consists of a convolutional layer, a pooling layer, and a fully-connected layer.

In the convolutional layer, a 2D filter having a fixed size is slid on 2D data and a convolution operation is performed. At this time, a plurality of filters may be used, and in this case, convolution is performed by using a 3D filter, and the result thereof is expressed in a 3D manner. In a general CNN, observation data is analyzed from various angles by applying a plurality of filters to extract the results.

The pooling layer has a dimension of "width×length× number of filters" as the result after the convolutional layer. In general 2D data, since pieces of information on neighboring regions are highly similar to each other, the dimension may be reduced by selecting a representative value from the neighboring regions. This process is performed in the pooling layer.

The fully-connected layer refers to a last layer in which the observation data is propagated along a plurality of convolution-pooling layers and then connected to the last output layer. The fully-connected layer refers to NN that is completely connected to the output layer after transforming 3D data derived as a result of completing the convolution-pooling operation into 1D data.

Meanwhile, the NN receives and propagates 1D observation data, while the CNN receives 2D observation data. If the observation data is an image, the observation data may be directly input to the CNN and propagated, but in the case of a sound, 1D data needs to be transformed into 2D data. In general, 1D acoustic data is converted into a spectrogram by applying Short Time Fourier Transform (STFT), and modified to a log scale by applying a Mel-filter reflecting a human auditory characteristic sensitive to low frequencies, so that a 2D log-Mel spectrum is converted and input to the CNN.

The communication unit 110 of the identification server 100 may receive the acoustic signal input to the animal species identification apparatus 200 (S350).

The acoustic processing unit 130 may process the received acoustic signal to derive an acoustic information processing result.

First, the acoustic processing unit 120 may perform acoustic quality improvement (S360).

A beamforming method is applied as a method for reducing noise in the acoustic signal input by the microphone 4. Beamforming (not illustrated) is a method of extracting a signal input in a specific direction, and may be configured by an acoustic signal input unit, a phase difference calculation unit, a noise component extraction unit, a signal size estimation unit, and a noise cancellation coefficient calculation unit.

The acoustic signal input unit is a part that converts the signal input to the microphone 4 into a digital, and signals input from individual microphones are hereinafter referred to as first to fourth signals. The phase difference calculation unit calculates a phase difference between the first to fourth signals in order to estimate a direction by using a characteristic in which a difference in phase between the first to fourth signals occurs according to the direction of the acoustic signal. The noise component extraction unit considers a signal other than the calculated phase difference as noise and separates the signal. The signal size estimation unit estimates a signal size component by removing the noise extracted from the first to fourth signals. Finally, the noise cancellation coefficient calculation unit determines a ratio of the extracted noise to the signal size component as a noise cancellation coefficient and subtracts the ratio from the first to fourth signals to improve the observation signal.

The acoustic processing unit 130 may detect a necessary signal section from the improved observation signal (S370).

The acoustic processing unit 130 may apply a modified Double Fourier Transform Voice Activity Detection (DF-VAD) algorithm to detect a signal section in the acoustic signal with improved acoustic quality. After a 1D acoustic signal with improved acoustic quality is transformed to a 2D image (spectrogram) by applying Short Time Fourier Transform (STFT), Fast Fourier Transform (FFT) is applied once again in each frequency axis to extract information on temporal change of each frequency. At each frequency, start and end points of the signal are finally detected based on the information for each frequency band of a crying sound of an object to be identified (animal population) to determine the signal section.

Then, the acoustic processing unit 130 recognizes the sound through the detected signal section (S380).

The acoustic processing unit 130 may apply a CNN technique to recognize the detected acoustic signal. For example, the acoustic signal of the detected signal section is converted into a spectrogram by applying the STFT, and then converted into a log scale by applying a Mel-filter to generate a log-mel spectrum. At this time, the log-mel spectrum is input to a CNN for acoustic signal recognition, passes through the convolution, pooling, and fully-connected layers, and a class-specific score of the acoustic signal is calculated in the final output layer.

FIG. 6 is a CNN structure diagram for recognizing an acoustic signal according to an embodiment of the present invention.

The CNN consists of 5 convolutional layers illustrated and 2 fully-connected layers. In each convolution layer, the size of the filter is the same as 3×3, and 2×2 max-pooling was applied after the first, second, and last convolutional layers. In the drawing, numbers represent a dimensional change of the data while propagating through the CNN. The dimension of the final output layer is determined by the number of objects to be recognized, and FIG. 6 illustrates an example of a CNN structure that recognizes a total of 9 species. When the number of objects to be recognized increases, the dimension of the final output layer increases, and the internal structure may also be modified.

The fusion unit 140 may fuse the results processed by the image processing unit 120 and the acoustic processing unit 130 (S390).

FIG. 7 is a flowchart illustrating a method for fusing image information and acoustic information in the method for identifying animal species according to an embodiment of the present invention.

The fusion unit 140 of the identification server 100 may determine whether both the image information processing result processed by the image processing unit 120 and the acoustic information processing result processed by the acoustic processing unit 130 exist (S710). The image information processing result and the acoustic information processing result may be expressed as class-specific scores.

If both the two results exist, the fusion unit 140 may fuse the score for the image information processing result and the score for the acoustic information processing result (S720).

However, if only one of the two results exists, the final result is determined depending on the processing result of the information in which the result is derived.

For example, if only the image information processing result exists, the image information may be called to finally classify the object to be identified as a certain animal species (S730 and S740).

In addition, if only the acoustic information processing result exists, the acoustic information may be called to finally classify the object to be identified as a certain animal species (S730 and S750).

Meanwhile, when both the two results exist, each score is fused in the image/acoustic score fusion step to derive the final result according to Equation 8.

$$finalresult = \mathrm{argmax}_c \left( \sum_{n=1}^{N} w_c^n \bar{s}_c^n \right) \quad \text{[Equation 8]}$$

c and n represent indexes for an object to be recognized and a system, respectively, $w_c^n$ means the fidelity of a c-th object to be recognized in an nth system, $s''_c$ means a score for the c-th object to be recognized in the nth system, and $\bar{s}_n^c$ means a score normalized by dividing $s_c^n$ by $$\sum_{c=1}^{C} s_c^n.$$

Equation 8 above derives a recognition result as an object to be recognized having the highest score when adding the fidelity to the score of each object to be recognized in each system.

The fidelity $w_c^n$ of the result derived from each system is calculated as in Equation 9 below.

$$w_c^n = P(G = c \mid O = c) = \frac{P(G = c, O = c)}{\sum_g P(G = g, O = c)} \quad \text{[Equation 9]}$$

In this case, G means an actual value and O means a recognition result obtained from the recognition system. That is, $w_c^n$ means a conditional probability $P(G=c|O=c)$ that when the result of the recognition system is c, the actual value is also c, and may be expressed as a joint probability by the bayesian rule. This gives high fidelity when there are few cases in which a system is misrecognized as a specific object to be recognized, and gives low fidelity when not.

As described above, according to the method for identifying animal species according to an embodiment of the present invention, it is possible to more conveniently identify the animal species by using the audiovisual information of the object to be identified.

According to an embodiment of the present invention, it is possible to build an infrastructure for investigating native animals and supplement the manpower of insufficient experts by identifying animal species in an artificial intelligence method.

The method for identifying the animal species described above may be implemented in a form of a program command which may be performed through various computer means to be recorded in a computer readable medium. At this time, the computer readable medium may include a program command, a data file, a data structure, and the like alone or in combination. Meanwhile, the program commands recorded in the recording medium may be specially designed and configured for the present invention, or may be known to those skilled in the computer software art.

The computer readable medium includes a hardware device which is particularly configured to store and perform program commands, such as magnetic media, such as a hard disk, a floppy disk, and a magnetic tape, optical media such as a CD-ROM and a DVD, magneto-optical media such as a floptical disk, and memory storage devices such as a ROM, a RAM, a flash memory, and a solid state drive (SSD).

Meanwhile, such a recording medium may be a transmission medium such as optical or metal wires, waveguides, etc., which include carrier waves for transmitting signals specifying program commands, data structures, and the like.

In addition, the program commands include high-level language codes executable by a computer by using an interpreter, etc., as well as machine language codes created by a compiler. The hardware device described above may be configured to be operated with one or more software modules in order to perform the operation of the present invention and vice versa.

In the method and apparatus for identifying the animal species described above, configurations and methods of the described embodiments may not be limitatively applied, but all or some of the respective embodiments may be selectively combined and configured so as to be variously modified.

Hereinabove, the present invention has been described with reference to the embodiments thereof. It is understood to those skilled in the art that the present invention may be implemented as a modified form without departing from an essential characteristic of the present invention. Therefore, the disclosed embodiments should be considered in an illustrative viewpoint rather than a restrictive viewpoint. The scope of the present invention is defined by the appended claims rather than by the foregoing description, and all differences within the scope of equivalents thereof should be construed as being included in the present invention.

What is claimed is:

1. A method for identifying animal species comprising:
    a step of receiving an input signal for an object to be identified;
    a step of processing image information and acoustic information based on the input signal, wherein a processing result of the image information and a processing result of the acoustic information are represented by class-specific scores;
    a step of determining whether the image information processing result and the acoustic information processing result corresponding to the input signal exist; and
    a final result derivation step of fusing the image information processing result and the acoustic information processing result according to the determination result, and classifying the object to be identified as a certain animal species by using the fused processing result,
    wherein the final result derivation step includes a step of fusing the score of the image information processing result and the score of the acoustic information processing result when both the image information processing result and the acoustic information processing result exist,
    wherein the final result derivation step derives the final result by using Equation 1 below: and $$finalresult = \text{argmax}_c \left( \sum_{n=1}^{N} w_c^n \tilde{s}_c^n \right) \quad \text{[Equation 1]}$$

wherein, c and n represent indexes for an object to be recognized and a system, respectively, $w_c^n$ means the fidelity of a c-th object to be recognized in an nth system, $s_c^n$ means a score for the c-th object to be recognized in the nth system, and $\tilde{s}_c^n$ means a score normalized by dividing $s_c^n$ by $$\sum_{c=1}^{C} s_c^n.$$

2. The method for identifying the animal species of claim 1, wherein the final result derivation step includes a step of classifying the object to be identified as a certain animal species by using any one of the scores of the image information processing result and the score of the acoustic information processing result when only one of the image information processing result and the acoustic information processing result exists.

3. The method for identifying the animal species of claim 1, wherein $w_c^n$ in Equation 1 above is calculated by Equation 2 below:

$$w_c^n = P(G = c \mid O = c) = \frac{P(G = c, O = c)}{\sum_g P(G = g, O = c)} \quad \text{[Equation 2]}$$

wherein, G means an actual value and O means a recognition result obtained from the recognition system.

4. The method for identifying the animal species of claim 3, wherein the image information and acoustic information processing step includes a step of processing the image information and the acoustic information by using a convolutional neural network (CNN) technique.

* * * * *